United States Patent Office 3,422,325
Patented Jan. 14, 1969

3,422,325
DEVICE FOR DRIVING A MOVABLE PART WITH PRECISE CONTROL OVER ITS DISPLACEMENT DURING MOVEMENT
Heinz Joseph Gerber, West Hartford, and David Jopson Logan, Glastonbury, Conn., assignors to The Gerber Scientific Instrument Company, South Windsor, Conn., a corporation of Connecticut
Filed Mar. 10, 1964, Ser. No. 350,864
U.S. Cl. 318—18                    20 Claims
Int. Cl. H02p *1/54;* H02p *5/46;* H02p *7/68*

ABSTRACT OF THE DISCLOSURE

A device for moving a movable part such as the pen of an X–Y plotter includes a displacement error correcting system for precisely controlling the displacement of the part throughout its movement between two selected end points so that the part may be made to closely follow a desired line or path of movement. The error correcting system includes a high horsepower motor for supplying the main driving effort and a small horsepower, high response correcting motor connected to the main drive motor through a mechanical differential and responsive to displacement error signals. In the case of a part movable along two coordinate axes the device may be operated such that correction of displacement errors is accomplished by only one correcting motor influencing the motion along only one axis.

---

This invention relates to systems for controlling the movement of a given part relative to other parts, and deals more particularly with such systems for maintaining the instantaneous displacement of the controlled part very close to a desired instantaneous displacement as it is moved between two selected end positions.

In the past, motion control systems utilizing relatively high power drive motors have been accompanied by relatively large errors. This is due, at least in part, to the usually high inertias of the motors which render them unalbe to respond rapidly to sudden changes in the inputs thereto. The present invention overcomes the large errors present in previous systems by providing a drive comprising a high power drive motor for supplying the major driving effort or power and also comprising one or more lower power correcting motors, having greater precision, for correcting or compensating for the errors inherent in the drive motor. The system of the present invention also involves a means especially adapted for use with the above-mentioned drive for determining the presence of errors and for supplying error signals to the correcting motor or motors.

In the description which follows, a general discussion is first made of the drive and of the error detecting means comprising parts of the overall system, and this is followed by a more detailed description of several embodiments of the invention as applied to a plotter or similar mechanism wherein a print head or other part is movable in the two dimensions of a two-dimensional coordinate system. It should be understood, however, that the detailed descriptions are intended mainly for illustrative purposes and that, at least in some of its aspects, there is no intention to limit the invention to the specific details shown and discussed. In particular, it should be understood that the invention in its broader aspects is not limited to the control of parts movable in two dimensions, but may also be applied to the control of parts movable in only one dimension (for example a rotating radar antenna) or movable in three or more dimensions (for example the cutter of a three-dimensional contour milling machine).

Also, in the embodiments illustrated herein, the error is determined by designating one coordinate axis the command axis and by designating the other coordinate axis the non-command axis and by establishing a formula or equation expressing the desired path of the controlled part as a relation of the displacements of the part from such coordinate axis, the displacement from the non-command axis being an independent variable and the displacement from the command axis being a dependent variable. At rapidly repeated intervals, the control system operates to compare the actual displacement of the controlled part from the command axis with the desired displacement as given by the solution of the equation at the instantaneous actual displacement of the part from the non-command axis. Any difference results in the production of an error signal transmitted to the correcting motor to produce a correcting influence on the movement of the part. It will be obvious, however, that other methods of determining error may be used with the drive means of this invention. Also, time, position of a second part with respect to some coordinate axis, pressure, or another quantity may be the independent variable; and the displacement of the controlled part in one or more axes may be the dependent or controlled variable.

In the detailed embodiments described herein the desired path of the controlled part is broken down into a number of segments over which the part is moved in sequence. When the part arrives at the beginning point of each segment, information defining the segment is fed into the system and the part is thereafter moved to the end point of the segment as a result of the operation of the system. Each path segment is a straight line and the information fed into the system preparatory to the tracing of each such segment consists of the coordinates of the starting position of the part and the coordinates of the desired final position of the parts, as measured from the coordinate axes. In its broader aspects, however, the invention when applied to two- or three-dimensional path control situations is not necessarily limited to the tracing of straight line path segments, and as explained in more detail hereinafter, the controlled part may be moved along curved paths or segments of paths, such as circular, parabolic or elliptical arcs. In this latter instance, information defining the character of the desired curved path is also fed into the system in addition to the end point coordinates.

The general object of this invention is therefore to provide a motor control system or device for maintaining a movable part very close to a desired instantaneous position.

A more particular object of this invention is to provide a motion control system or device according to the preceding paragraph especially suitable for use in controlling the movement of parts having relatively high inertias.

A still further object of this invention is to provide in a motion control system or device a drive means having relatively high driving power yet also having the precision and other capabilities usually present only in high response, low horsepower driving devices such as stepping motors or low inertia servo systems.

Another object of this invention is to provide a drive means according to the preceding paragraph wherein one or more low horsepower, high response correcting motors are combined with a high horsepower, low response drive motor in such a manner as to compensate for errors in the output of the drive motor and to thereby give the combined output of the motors the high power characteristic of the drive motor and the high response characteristic of the correcting motor or motors.

Another more specific object of this invention is to provide a motion control system or device employing a basic drive motor or servo system which may be controlled by an analog command signal and in which system the error is detected and corrected by basically digital means so as to achieve the accuracy and precision of digital motion control systems.

Still another object of this invention is to provide in a system or device according to the preceding paragraph and improved means for detecting the presence of an error and for producing a corresponding error signal.

Other objects and advantages of the invention will be apparent from the following description and from the drawings forming a part hereof.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Figure 1:
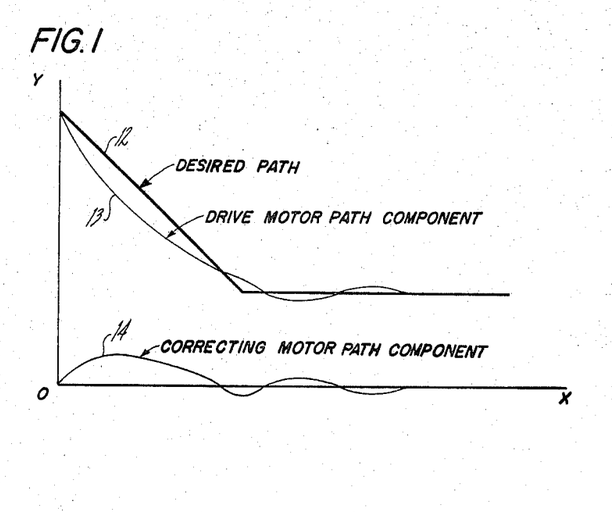
FIG. 1 is a graphical illustration of the operation of the correcting motor drive comprising a part of the motion control system of the present invention.
Figure 2:
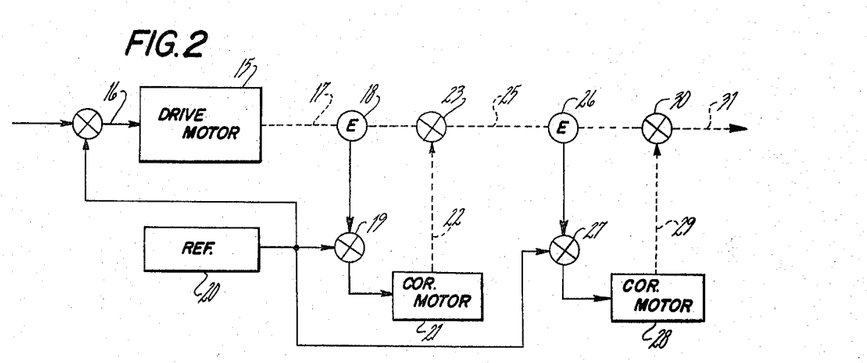
FIG. 2 is a block diagram illustrating the basic components making up a correcting motor drive in accordance with the present invention, the illustrated drive including two correcting motors.

*General discussion of the correcting
Motor drive—FIGS. 1 and 2*

FIGS. 1 and 2 show in general the operation and construction of a correcting motor drive wherein one or more correcting motors are employed to compensate for the errors present in the output of a main drive motor. Such a correcting motor drive is especially well suited for use with a digital error determining means such as described in detail hereinafter, but its use is not necessarily limited to any particular method or means for error determination. It is particularly useful in any motion control system in which a high horsepower drive having high precision and accuracy is desired.

Referring first to FIG. 1, the heavy line 12 represents the desired path of movement of the controlled part in a motion control device wherein the controlled part is movable in both dimensions of a two-dimensional coordinate system represented by the axes X and Y. Assuming that this path is to be traced at a relatively high speed, the actual path of the part in a conventional motion control device having no correcting motor may typically be represented by a line, such as the line 13, which does not follow exactly the desired line 12. To overcome and compensate for the error existing between the desired line 12 and the actual line 13, the correcting motor of the present invention produces an output which is added to the movement of the controlled part and which output is exactly or very nearly equal to the error. In FIG. 1 the component of movement produced by the correcting motor is indicated by the line 14. When this latter component is added to the component produced by the drive motor, as represented by the line 13, the resultant movement of the part will coincide with the desired line 12.

Referring to FIG. 2, a correcting motor drive in accordance with the present invention is shown to comprise a main drive motor 15 which is of relatively high horsepower in comparison to the correcting motors and which typically has a relatively low response. This drive motor is responsive to a command signal appearing on an input line 16 and has an output element, represented at 17, which in a typical case may be taken to be positioned within ±10% of the position commanded by the input appearing on the line 16. The output element 17 may be taken to be a rotating shaft and associated with this shaft is an encoder 18 which senses the shaft position and produces an output signal transmitted to a summing or comparing device 19. Also transmitted to the summing or comparing device 19 is the output of a reference device 20 which provides a signal representative of the desired instantaneous position of the controlled part. The output of the summing or comparing device 19, which is representative of the error existing in the output 17, is transmitted to a first correcting motor 21 having an output element 22 the displacement of which is controlled in response thereto. The movement of the output element 22 is in turn transmitted to a mechanical summing device 23, such as a differential mechanism and combined with the movement of the output element 17. Assuming that the correcting motor 21 is capable of positioning its output element 22 with ±10% of the input signal thereto, it will be apparent that the output element 25 of the mechanical summing device 23 will be positioned within an overall system error of ±1.0%.

If the overall system error obtained by the use of one correcting motor is still too large, it may be further reduced by using one or more additional correcting motors arranged according to FIG. 2, which for the purposes of illustration includes a second correcting motor. In FIG. 2, the output element 25 of the first mechanical summing device 23, which again may be taken to be a rotatable shaft, has associated therewith a second shaft encoder 26 the output of which is transmitted to a summing or comparing device 27 and compared with the output signal of the reference source 20 to produce an error signal transmitted to the second correcting motor 28. The movement of the output element 29 of the latter motor is in turn transmitted to a second mechanical summing device 30 and combined with the movement of the output element 25 to produce a resultant movement of the output element 31. Assuming the second correcting motor 28 to have a ±10% error similar to the motors 15 and 21, the resulting position of the element 31 will have an overall system error of ±0.1%.

In FIG. 2, the system has been shown adapted for use in connection with the control of the displacement of the output element 31. The same system may also be used to control the velocity or speed of the output element by replacing the encoders 18 and 26 with speed sensing devices, such as tachometers, by providing correcting motors 21 and 28 wherein the speed of the output elements is controlled in response to the input signals to the motors, and by providing a reference source 20 which supplies an output signal representative of the desired instantaneous velocity or speed of the output element 31.

*General discussion of the motion control system*

Figure 3:
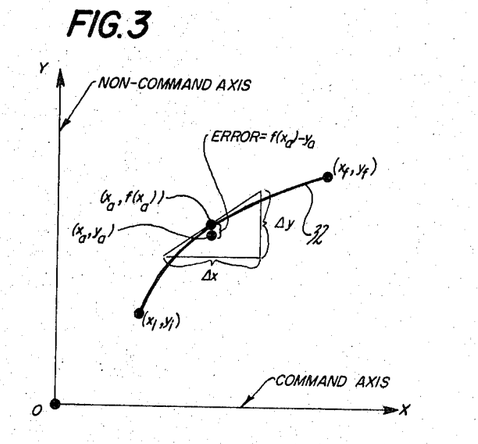
FIG. 3 is a graphical illustration of the coordinates and other quantities involved generally in the determination of errors by the error determining means comprising another part of the motion control system of this invention.
Figure 4:
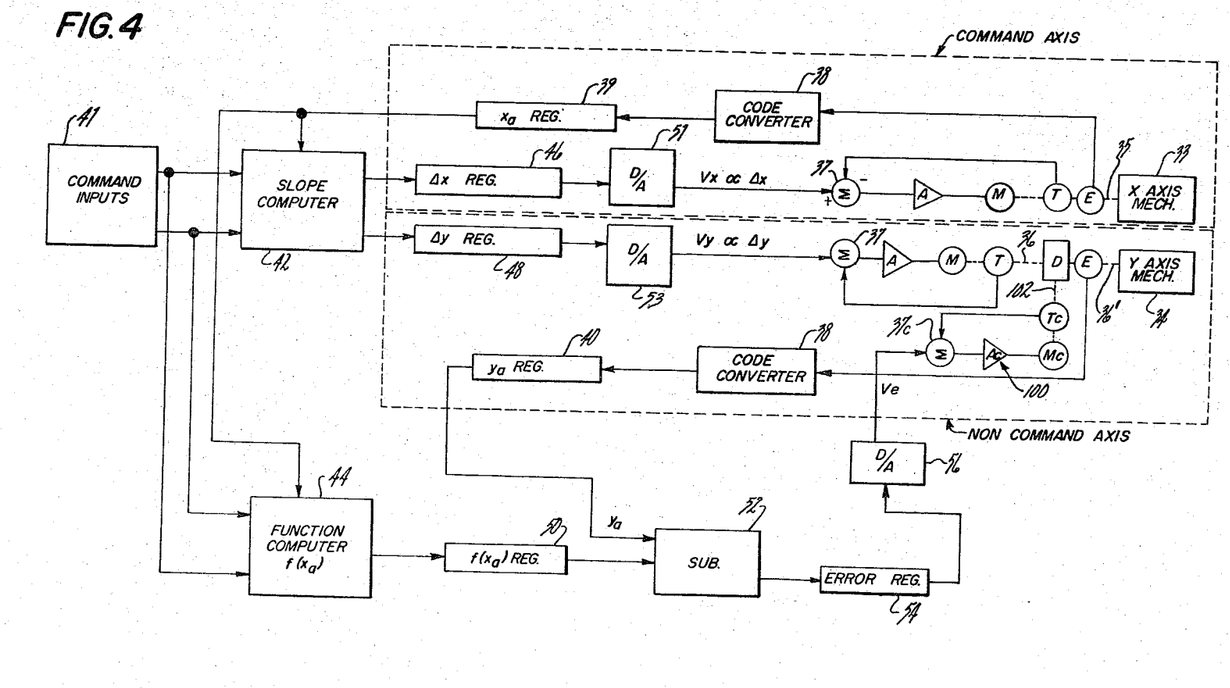
FIG. 4 is a block diagram illustrating generally the basic components comprising a motion control system embodying the present invention and applied to a plotter, this system including a voltage controlled servo system for introducing an error correcting influence.

*FIGS. 3 and 4*

FIGS. 3 and 4 show in general the basic components and operational features of a motion control system embodying the present invention and applied to a plotter or other two-dimensional device for tracing path segments which may take on various shapes capable of definition by a mathematical relationship or equation expressing one coordinate of each point on the path as a function of the other coordinate.

Referring to FIG. 3, the line 32 represents a path segment over which it is desired to move the controlled part. This path is shown in conjunction with an associated two-dimensional coordinate system comprising the illustrated mutually perpendicular X and Y axes. In the description of the various systems which follow, the description is generally limited to the drawing of a single path segment such as that shown at 32; however, it will be understood that the complete path of movemen of the part may be made up of a great number of such segments which are traced in succession by the controlled part through the operation of the system. As shown in FIG. 3, the X axis is taken to be the command axis and the Y axis is taken to be the non-command axis.

Still referring to FIG. 3, the coordinates $(x_i, y_i)$ represent the starting point of the path segment 32 and the coordinates $(x_f, y_f)$ represent the final point cordinates of the path segment. Between these two end points the path segmen 32 is represented by the expression $y=f(x)$. The coordinates $(x_a, y_a)$ represent the actual position of the controlled part. If the point $(x_a, y_a)$ does not fall on the line 32 an error is involved, and in accordance with the present invention this error is measured parallel to the non-command axis. The coordinates $(x_a, f(x_a))$ represent the point intersected on the line 32 by a line drawn parallel to the non-command axis and through the point $(x_a, y_a)$, and therefore the positional error of the controlled part may be defined as equal to $f(x_a)-y_a$. As will be explained in more detail below, the motion of the controlled part is controlled in accordance with the slope of the desired path at the point $(x_a, f(x_a))$ on the path 32 corresponding to the instantaneous or actual displacement of the controlled part from the non-command axis as measured parallel to the command axis.

Turning now to FIG. 4, a numerically controlled servo system embodying the present invention is shown to include a mechanism 33 for moving the controlled part parallel to the X axis of the associated coordinate system and a similar mechanism 34 for moving the controlled part parallel to the Y axis of the associated coordinate system. The mechanisms 33 and 34 may take a wide variety of forms depending on the nature and use of the controlled part, but as illustrated each mechanism includes a movable input drive member, indicated respectively at 35 and 36', which may be taken to be a rotatable drive shaft. Rotation of the drive member 35 through a given angular displacement produces a corresponding proportionally related movement of the controlled part in a direction parallel to the X axis and movement of the drive shaft 36' through a given angular displacement similarly produces a corresponding proportionally related movement of the controlled part in a direction parallel to the Y axis. Each of the input drive members 35 and 36' is in turn driven by a main drive means comprising a rate servo system responsive to voltage control signals. As shown, each of the main servo systems is of conventional construction and includes an input device or summing network 36, an amplifier A, a drive motor M and a tachometer T, the output of teh tachometer T providing negative feedback for the system as shown. The drive mechanism for the Y axis also has associated therewith a differential mechanism D which has as inputs thereto the output shaft 36 of the associated main servo system and the output shaft 102 of an associated correcting servo system hereinafter described in more detail, the drive member 36' being the output member of the differential D. Also respectively associated with and driven by each of the input drive members 35 and 36' are shaft encoders E, E which sense the positions of the shafts 35 and 36' and provide coded output information representing the actual coordinates of the controlled part with respect to the X and Y axes. The output of each of the encoders E, E may, for example, be in Gray code, and associated with the encoders are code converters 38, 38, respectively, which are each operable to convert the coded output of the associated encoder into a digital representation which is supplied to an associated register 39 or 40. This digital representation, and the other digital representations referred to herein, may for example be a representation of a binary number and consist of a train of electrical pulses circulated through a delay line type of register with the presence or absence of a pulse at a particular portion of the train representing the presence of a 1 or 0 at a particular place in the binary number. It will also be understood that although various different registers have been shown in the various systems herein described for the storage of various digital representations, in each system the function of two or more such registers may, if desired, be fulfilled by a single delay line register in which each digital representation occupies a given portion of the signal circulated through the register.

The register 39 is referred to as the $x_a$ register and stores a digital representation of the $x_a$ coordinate or the actual displacement of the controlled part from the Y axis as measured parallel to the X axis. Similarly, the register 40 is referred to as the $y_a$ register and stores a digital representation of the $y_a$ coordinate or the actual displacement of the controlled part from the X axis as measured parallel to the Y axis. Throughout the movement of the controlled part over the path 32, the encoders E, E are repeatedly interrogated at a high interrogation rate, for example several thousand times per second, and the registers 39 and 40 updated as necessary at equally high speeds so that the digital representations appearing in the registers at any given instant accurately represent the instantaneous actual position of the controlled part.

Input information is supplied to the system of FIG. 2 by an input device 41 which may, for example, be taken to be a punched paper tape reading mechanism. Preparatory to the drawing of each line segment such as the segment 32, input information supplied by the input information supplied by the input device 41 is fed into the remainder of the system. If the line segments traced by the controlled part are limited to straight lines, this input information may consist of nothing more than the desired end point coordinates $(x_f, y_f)$ of the following line segment. Where, however, the line segments are curved in shape, the input information may also include information defining the equation $y=f(x)$ of the line segment, the sign of the curvature, the location of the center, etc. This information is supplied to a digital computer which, as shown in FIG. 2, may be taken to comprise two separate digital computers 42 and 44, the computer 42 being referred to as a slope computer and the computer 44 being referred to as a function computer. Also supplied to these two computers is the digital representation stored in the command axis register 39. In actuality the two computers 42 and 44 may of course consist of a single computer capable of performing the slope and function computations sequentially.

The slope computer 42 operates to compute the slope of the path segment 32 at the point thereon $(x_a, f(x_a))$ corresponding to the instantaneous actual coordinate $(x_a)$ of the controlled part with respect to the command axis. The result of this computation is provided in the form of two digital representations, referred to as $x$ and $y$, which bear a ratio one to the other equal to the instantaneous slope $$\left(\frac{dy}{dx}\right)_{x_a}$$

of the path at said point. Referring to FIG. 3, for example, the digital expressions $\Delta x$ and $\Delta y$ may represent the illustrated distances $\Delta x$ and $\Delta y$ which are so related that the ratio $\Delta y/\Delta x$ is equal to the slope of the path 32 at the point $(x_a, f(x_a))$ as represented by the line drawn tangent to the path at such point. The $\Delta x$ and $\Delta y$ digital representations appear respectively in two registers 46 and 48 which may be taken to be part of the slope computer 42. Associated with the register 46 is a digital to analog converter 51 which operates to convert the $\Delta x$ digital representation in the register 46 into an analog voltage $V_x$ which is analogously related to the numerical value of the digital representation $\Delta x$. Similarly, a digital to analog converter 53 is associated with the register 48 and operates to convert the $\Delta y$ digital representation into an analogously related voltage $V_y$. The two analog voltages $V_x$ and $V_y$ are in turn transmitted to the respectively associated summing networks 37, 37 of the two rate servo systems with the result that the motor M of the X axis mechanism is driven at a speed substantially proportionally related to the control voltage $V_x$ and the motor M of the Y axis mechanism is driven at a speed substantially proportionally related to the input voltage $V_y$.

The function computer 44 computes the desired non-command axis coordinate $f(x_a)$ corresponding to the actual position of the controlled part $(x_a)$ as measured along the command axis. The function computer 44 similar to the computer 42 is a digital computer and the result of its computation appears in a register 50 as a digital representation of the quantity $f(x_a)$.

Associated with the register 50 and the register 38 is a subtractor 52 which operates to subtract the digital $y_a$ representation from the digital $f(x_a)$ representation produce a digital representation of the error which latter digital representation is transmitted to an error register 54. The latter digital error representation is then used to modify the movement of the Y or non-command axis mechanism in such a manner as to tend to produce the physical error existing in the position of the controlled part. This correcting influence may be introduced in various ways and in the FIG. 4 system is introduced by a correcting rate servo system indicated generally at 100 and comprising a summing device 37c, an amplifier Ac, a servo motor Mc and a tachometer Tc. The correcting servo motor has an output shaft 102 which provides an input to the differential D. A digital to analog converter 56 converts the digital error representation appearing in the error register 54 into an analog voltage $V_e$ which is transmitted to the summing device 37c of the correcting servo system 100 to produce a rotation of the shaft 102 which through the differential D is added to the output of the main servo system in such a manner as to reduce the error.

Although the various components making up the system of FIG. 4 are not shown or described in detail, various suitable components for performing the necessary operations will be readily apparent to persons skilled in the art. In FIG. 4 and other block diagrams described hereinafter, the clock system for synchronizing and otherwise controlling the operation of the various system components, as well as the means for determining the signs of the control voltages $V_x$ and $V_y$ and the error voltage $V_e$, have been omitted for clarity. These means are conventional and their application to the illustrated systems will be readily apparent to those skilled in the computer and numerical control art.

Figure 5:
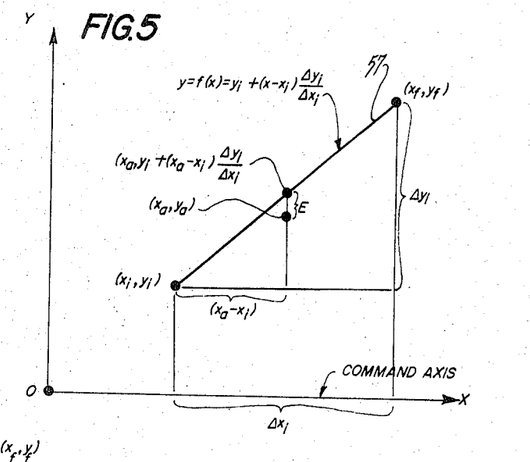
FIG. 5 is similar to FIG. 3 but illustrates in more particularity the components and other quantities involved in the determination of errors by the error determining means of this invention when the controlled part is moved along straight line path segments.
Figure 6:
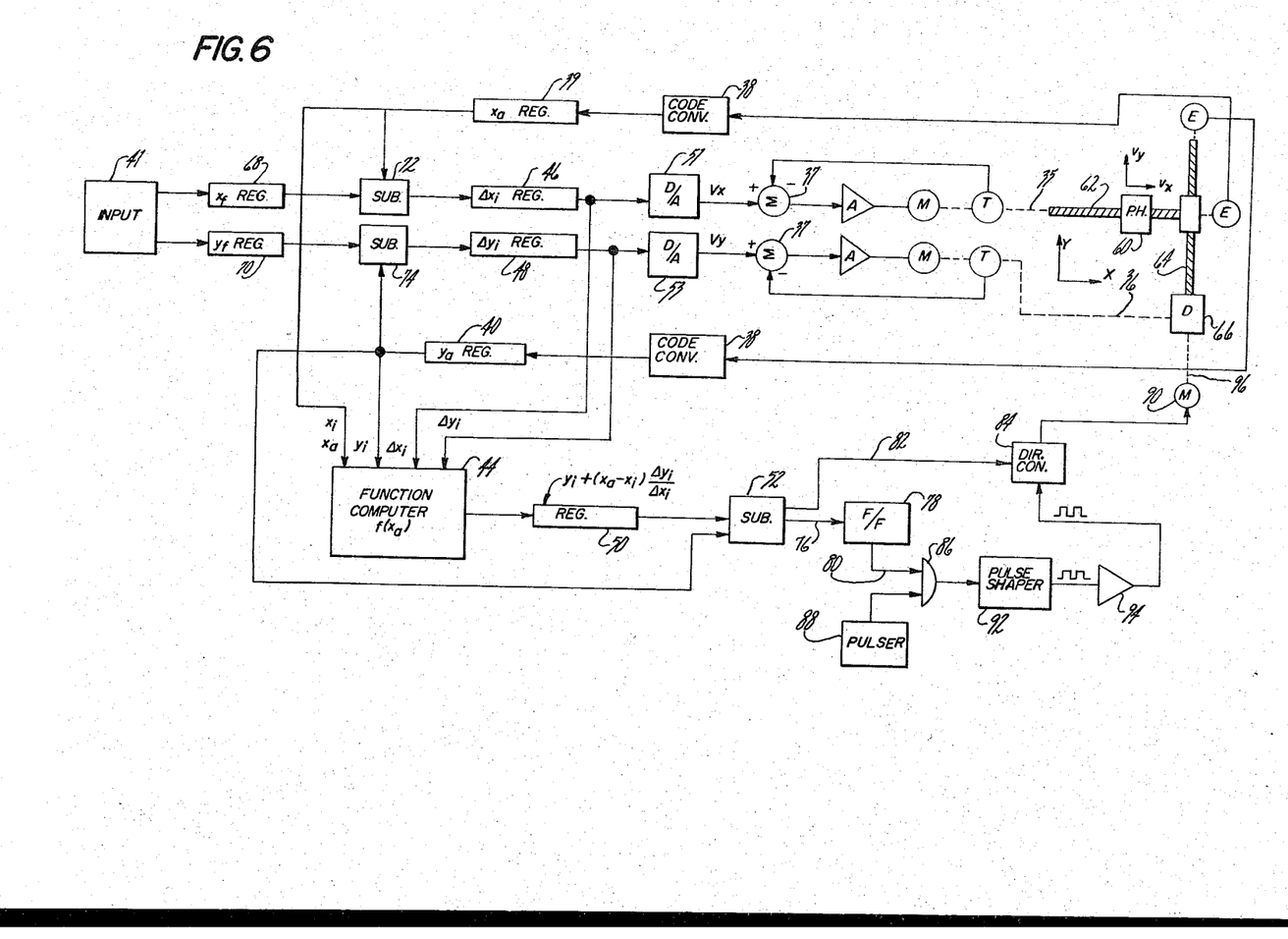
FIG. 6 is a block diagram of a motion control system which block diagram is generally similar to that of FIG. 4 except for showing some of the components in more detail and for showing a stepping motor for introducing an error correcting influence, the system also being limited to the movement of the controlled part along a straight line path.

*Motion control system for tracing straight line path segments FIGS. 5 and 6*

Reference is now made to FIGS. 5 and 6 which relate to and show in more detail a path control system generally similar to that shown in FIG. 4, but limited to the tracing of straight line path segments and employing a correcting motor drive, generally similar to the scheme of FIG. 2, for exerting a correcting influence on the positioning of the controlled part. If the complete path of the controlled part is broken up into a number of straight line path segments, the slope of each such path segment is a constant. Therefore in connection with the tracing of each path segment, the slope computation is simplified and need be performed only once at the beginning of the tracing operation. Also, the only input information required for the tracing of each line segment is the coordinates $(x_f, y_f)$ of the final point of the segment, it being assumed that the starting point coordinates $(x_i, y_i)$ are already in the system and supplied by the encoders E, E or the like.

Referring to FIG. 5, a straight line path segment is indicated at 57. The coordinates $(x_i, y_i)$ represent the beginning or starting point of the line and the coordinates $(x_f, y_f)$ indicate the final point of the line. The distances $\Delta x_i$ and $\Delta y_i$ respectively represent the required positional changes of the controlled part, as measured parallel to the X axis and the Y axis, in moving from the starting point to the final point. The coordinates $(x_a, y_a)$ represent the actual position of the controlled part and the term $(x_a - x_i)$ represents the actual displacement of the controlled part, as measured parallel to the X axis, from the starting point. From this it will be undertood that the equation defining the line segment 57 may be written as $$y = f(x) = y_i + (x_a - x_i)\frac{\Delta y_i}{\Delta x_i}$$

Also, the coordinates $$\left(x_a, \; y_i + (x_a - x_i)\frac{\Delta y_i}{\Delta x_i}\right)$$

define a desired point on the line 57 corresponding to the actual position of the part $(x_a)$ as measured parallel to the command axis from the non-command axis.

Turning to FIG. 6, the components thereof which are similar to those of the FIG. 4 system have been given the same reference numerals as in the FIG. 4 system and need not be redescribed in specific detail. As an example of a particular application of the system, FIG. 6 shows the system used in conjunction with a plotter having a print head 60 movable in mutually perpendicular directions relative to a stationary chart sheet. The print head is driven parallel to the X axis by a screw shaft 62, and the screw shaft 62 and the print head 60 are in turn moved parallel to the Y axis by another screw shaft 64. The screw shaft 62 is drivingly connected with an associated one of the servo motors M through the drive shaft 35 and the screw shaft 64 is also drivingly connected with the other servo motor M through the drive shaft 36 and an associated mechanical summing device in the form of a differential gear mechanism 66. The position of the screw shaft 62 and accordingly the position of the print head 60 along the X axis is sensed by one encoder E, and the position of the screw shaft 64 and the position of the print head along the Y axis is sensed by the other encoder E. The illustrated plotter may, for example, be similar to that disclosed in the copending application for Gerber and Logan entitled "X–Y Plotter, Ser. No. 228,289, filed Oct. 4, 1962. Reference is herein made to said latter application for a more detailed undertanding of the construction of a suitable plotter mechanism capable of actuation by the control system of the present invention.

As mentioned, the input information into the system of FIG. 6 need consist only of the coordinates of the final point of each path segment. This information is supplied to two registers 68 and 70, a digital representation of the $x_f$ coordinate appearing in the register 68 and a digital representation of the $y_f$ coordinate appearing in the register 70. Associated with the register 68 is a subtracter 72 which operates prior to any movement of the part over the path segment to subtract the digital representation in the register 68 from the digital representation in the register 39. At this time, the controlled part is located at the starting point of the segment so that the number appearing in the register 39 is a digital representation of the $x_i$ coordinate. As a consequence, the result of the subtraction process performed by the subtracter 72 is the production of the quantity $\Delta x_i$ which is supplied to the register 46. Similarly, the $y_f$ register 70 has associated therewith a subtracter 74 which prior to any movement of the controlled part to subtract the digital representation appearing in the register 40 from that appearing in the register 70. Since at this time the number stored in the register 40 is a digital representation of the coordinate $y_i$, the result of this subtraction process is the quantity $\Delta y_i$ which is stored in the associated register 48. The ratio of the quantities stored in the registers 46 and 48 is therefore representative of the slope of the line segment 57 and is utilized in the same manner as described in connection with the FIG. 4 system to actuate the associated rate servo systems to move the controlled part or print head 60 parallel to the X axis and parallel to the Y axis at rates ($v_x$ and $v_y$) which are related to one another by a proportionality factor substantially equal to the slope of the path segment. That is, $v_y = Kv_x$ where K is substantially equal to the slope or $\Delta y_i / \Delta x_i$.

The function computor 44 of the FIG. 6 system has fed thereto as inputs the quantities stored in the registers 39, 40, 46 and 48. Preparatory to movement of the controlled part, the quantity appearing in the register 39 is the coordinate $x_i$ and this coordinate is stored in the function computor 44 for use throughout the tracing of the path segment. The digital representations appearing in the registers 46 and 48 remain constant throughout the tracing of the path segment, but as mentioned in connection with FIG. 4, the quantities appearing in the registers 39 and 40 are rapidly updated so that the digital representations appearing therein represent very accurately the instantaneous actual coordinates of the controlled part. Utilizing the input information supplied thereto, the function computor 44 operates repeatedly to compute the value of the function $f(x_a)$ or $$y_i + (x_a - x_i)\frac{\Delta y_i}{\Delta x_i}$$

This value is computed at a very rapid rate, preferably several thousand times per second, which is well within the capacity of presently available computor components. At substantially the same rate, the number appearing in the register 50 is transmitted to the substracter 52 and compared with the digital representations appearing in the register 40. If the two digital representations are not equal, an error representation or signal is produced by the subtracter 52. This signal appears on an output line 76 and is transmitted to an error detecting flip-flop 78 which functions to produce an output signal on the associated output line 80 whenever and for so long as errors are indicated by the subtracter 52. In addition to the error indication appearing on the line 76, the subtracter 52 also produces a directional signal indicating the sign of the error, which directional signal is transmitted by a line 82 to a directional control device 84.

The output of the flip-flop 78 is transmitted by the line 80 to an AND gate 86 which also has as an input thereto the output of a pulser 88. The pulser 88 produces electrical pulses at a rate, for example 300 cycles per second, within the operating limit of an associated correcting motor 90 of the stepping motor variety and may be part of the clock circuit associated with the system. The output of the AND gate 86 is transmitted through a pulse shaper 92 and through an amplifier 94 to the directional control 84 from where it is transmitted to the correcting motor 90. Therefore, whenever an error is indicated by the subtracter 52 a signal appears on the line 80 and the pulses produced by the pulser 88 are transmitted through the gate 86 and through the associated components to the correcting motor 90. Likewise, whenever the subtracter 52 indicates no error, no signal appears on the line 80 and no pulses are transmitted to the correcting motor. The correcting motor 90 contains a number of input windings which may be energized in one or another of two sequential patterns to cause rotation of the associated output drive shaft 96 in one or the other of its two directions, and energization of the windings is selectively controlled by the directional control 84 in response to the sign signal appearing on the line 82 so that the desired direction of rotation of the correcting motor is obtained. The rotational output of the motor 90 forms an input to the differential gear mechanism 66 associated with the Y or non-command axis screw shaft 64. The differential gear mechanism 66 is or may be of conventional construction and serves to combine the input motion of the correcting motor output shaft 96 with the primary input provided by the drive member 36 to produce a resultant movement of the screw shaft 64 which is equal or proportionally related to the sum of the rotations of the shafts 36 and 96. The input to the differential gear mechanism 66 provided by the correcting motor 90 therefore has a correcting influence on the movement of the print head 60 and causes the latter to be moved toward a position of zero error.

Because of the rapid operation of modern computer equipment, a numerical control system as shown in FIG. 6 may be designed so that the controlled part is moved at a relatively rapid rate, for example several inches per second, parallel to either or both of the coordinate axes, and at the same time the necessary computations are made at such a rate that the error is redetermined a thousand times or more for each inch of travel of the controlled part. The total error of the controlled part may therefore be maintained well within a few thousandths of an inch or better.

Usually the amount of torque required to drive the screw shafts 62 and 64 is such that if precision motors, such as stepping motors, are used by themselves to supply the driving effort, the resulting maximum speed of the print head will be relatively low due to the low horsepower characteristics of such precision motors. In the FIG. 6 system, the servo motors M, M, which may be of relatively high horsepower and capable of driving the screw shafts at high speeds, provide the main driving effort for the shafts, and the correcting motor 90 is relied upon to overcome the error existing in the output of the non-command axis drive motor M. The error involved is small, and therefore the correcting motor may be one of relatively low horsepower since only a relatively low output speed is required to overcome the error.

It will, of course, be understood that in the system of FIG. 6 an error correcting influence could also be produced by using a servo system similar to the servo system 100 of FIG. 4 in place of the stepping motor drive.

*Refinement of FIG. 6 System—FIGS. 7, 8a and 8b, and 9a and 9b*

Figure 7:
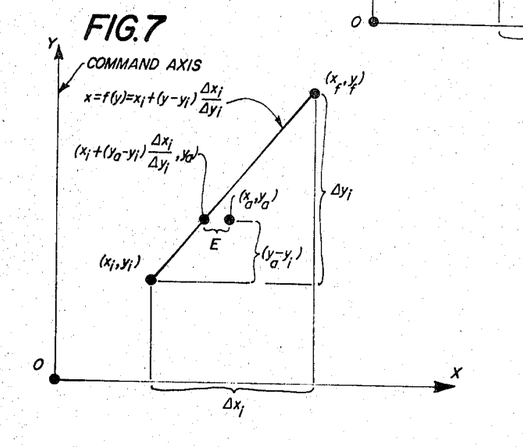
FIG. 7 is similar to FIG. 5 but shows the coordinates and other quantities involved in the error determination when the other coordinate axis is made the command axis.
Figure 8A:
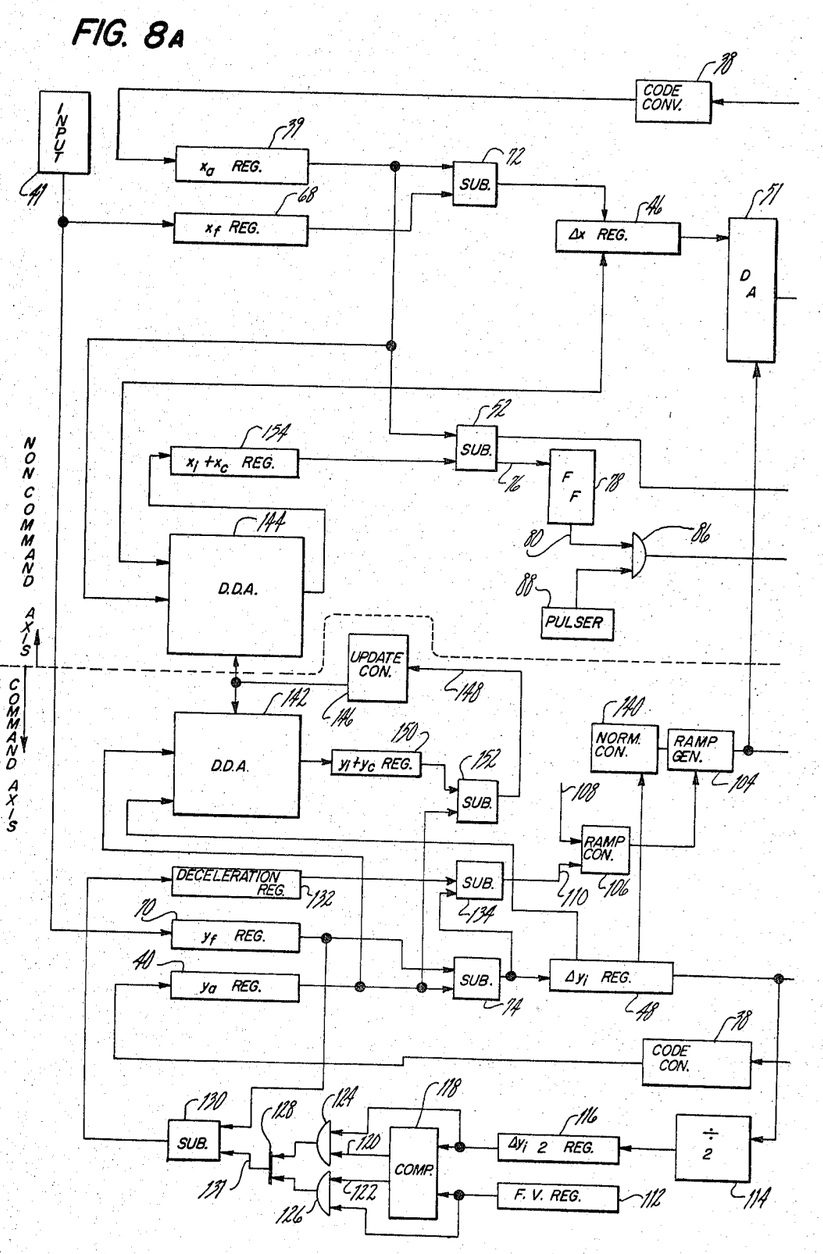
FIGS. 8a and 8b taken together are a block diagram representing a more specific embodiment of the general motion control system of FIG. 6 and showing the Y axis rather than the X axis as being the command axis.
Figure 8B:
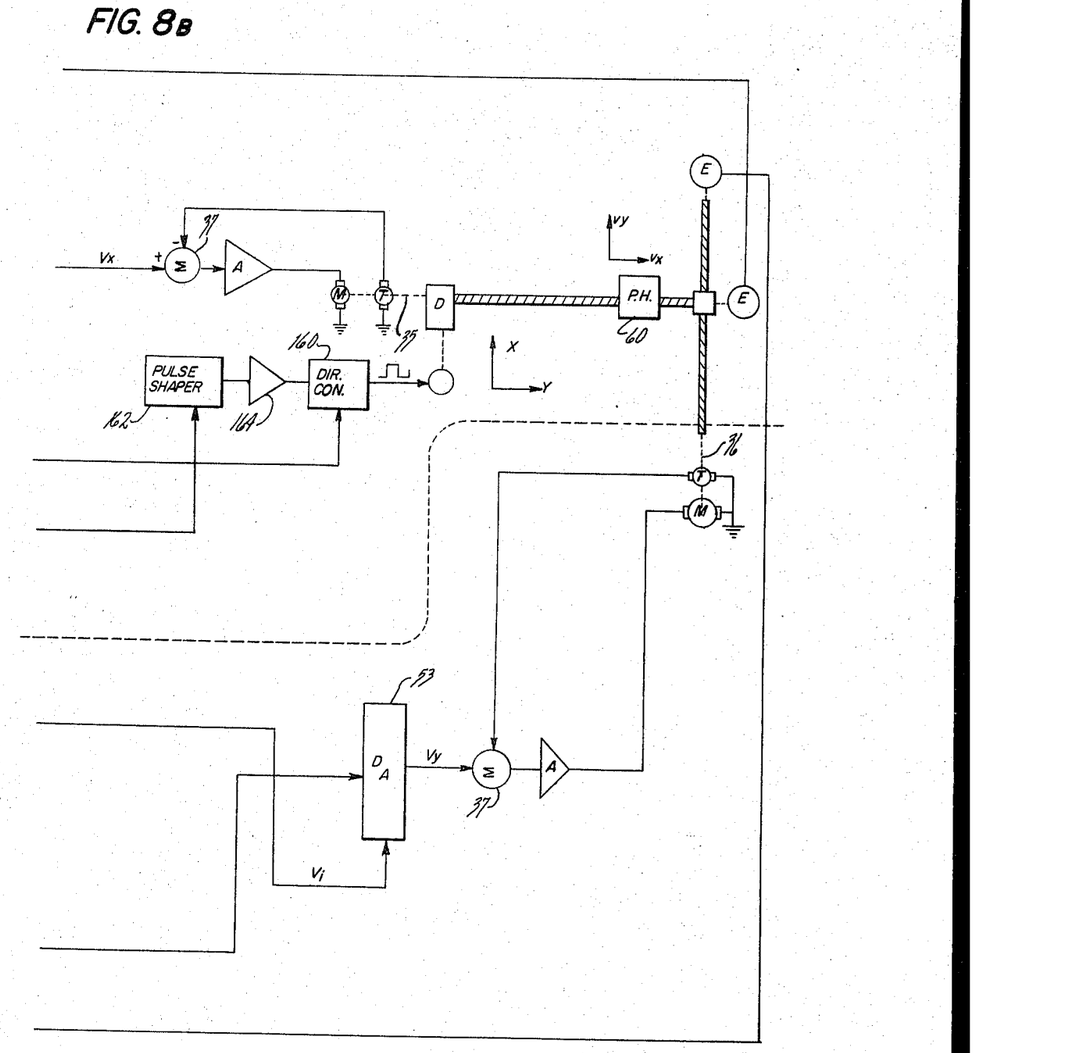

FIGS. 7 and 8a and 8b relate to a refinement of the FIG. 6 system wherein for the purpose of discussion the Y axis rather than the X axis has been chosen as the command axis.

Referring first to FIG. 7, this figure shows the coordinates and other quantities involved in making the Y axis rather than the X axis the command axis of the system.

From the previous discussion of FIG. 5, the import of the expressions presented on FIG. 7 should be clear and no further discussion required. It should be noted, however, that in this case the error E is measured parallel to the X axis and is equal to the quantity $$x_a - \left[ x_i + (y_a - y_i) \frac{\Delta x_i}{\Delta y_i} \right]$$

The components shown in the system of FIG. 8a and 8b which are similar to those shown in the system of FIG. 6 have been given the same reference numerals as in FIG. 6 and need not be redescribed in detail. Concerning the refinements to the system shown in FIGS. 8a and 8b, attention is first drawn to the fact that in the operation of the system, the controlled part after it arrives at the final point of one line segment comes to rest at said point for an instant during which instant the system accepts information concerning the coordinates of the final point of the following segment and computes the quantities $\Delta x_i$ and $\Delta y_i$. As soon as these computations are made movement of the part is started, the error is repeatedly computed and appropriate error corrections made as explained hereinabove. This movement of the controlled part is controlled primarily by the control voltages $V_x$ and $V_y$ applied to the respective rate servo drive systems. Obviously, it is desirable that large input voltages not be instantaneously applied to the rate servo drive systems at the start of a particular tracing process and it is further desirable that such input voltages not be abruptly terminated when the controlled part reaches the final point coordinates. More particularly, it is desirable that the voltages $V_x$ and $V_y$, at the start of the tracing of a line segment, be gradually increased to desirable values and later, during the final portion of the line segment, be reduced toward zero so that the controlled part is gradually brought up to a desired high speed at the start of each line segment, and is gradually reduced from such high speed at the end of each line segment.

In FIGS. 8a and 8b, the means for effecting a gradual start and stop of the controlled part comprises a ramp generator 104 and a ramp control mechanism 106. The ramp generator 104 controls the reference voltage $V_i$ supplied to the two digital to analog converters 51 and 53, the digital to analog converters 51 and 53 serving to attenuate the voltage $V_i$ in accordance with the digital representations appearing in the register 46 and 48 to produce the control voltages $V_x$ and $V_y$. At the start of the tracing of a line segment, a start or "up" signal supplied by the clock mechanism of the system appearing on the line 108 triggers the ramp control 106 and ramp generator 104 and causes the ramp generator to produce an output voltage $V_i$ which starts from zero voltage (or other reference voltage) and increases linearly with time to a desired maximum value and which remains at such maximum value until a "down" signal appears on the line 110. The "down" signal which does occur on the line 110 appears prior to the controlled part reaching the final point of the line segment and triggers the ramp control 106 and ramp generator 104 to cause the output voltage $V_i$ to be gradually reduced to a relatively low value which is applied to the digital to analog converters 51 and 53 when the controlled part does reach its final point coordinates.

As previously mentioned, the start or "up" signal appearing on the line 108 may be supplied by the clock mechanism associated with the system and occurs at the very start of the tracing of the line segment in question. The occurrence of the "down" signal on the line 110, on the other hand, is related to the location of the final point coordinates of the line segment and the length of the line segment itself. Usually the "down" signal occurs or is produced when the controlled part passes a point spaced a given distance, as measured parallel to the Y or command axis, from the final point of the line segment. This situation is obtained if the voltage $V_i$ attains its maximum value. However, if the command axis component of the line segment is shorter than a predetermined length, it may be necessary, for proper operation of the system, to apply the "down" signal to the ramp control 106 before the voltage $V_i$ attains its desired maximum value. Referring to FIGS. 8a and 8b, the means for producing the signal on the line 110 comprises a fixed value register 112 which stores a fixed number representative of the displacement, as measured parallel to the command axis, from the final point to the point at which the "down" signal must occur to reduce the voltage $V_i$ to a proper low level, assuming that such voltage is at its maximum value when the signal is applied.

Also included in the means for generating the "down" signal is a divide-by-two mechanism 114 which operates on the $\Delta y_i$ digital representation stored in the register 48 to produce a digital representation which is transmitted to an associated register 116 and which is equal to onehalf the numerical value of the representation in the register 48. The outputs of the registers 112 and 116 are introduced to an associated comparing device 118 which operates to produce an output on an associated line 120 if the representation stored in the register 116 has a lower numerical value than the representation stored in the register 112 and alternatively to produce a signal on the line 122 if the representation stored in the register 112 is numerically lower than the representation stored in the register 116. The line 120 constitutes an input to an associated AND gate 124 which also has as an input thereto the output of the register 116. Likewise, the line 122 constitutes an input for an associated AND gate 126 which also has as an input thereto the output of the register 112. The outputs of the two AND gates 124 and 126 are in turn transmitted to an OR gate 128 and the output of the latter gate transmited to a subtracter 130 by a line 131. The net function of these components is to supply the subtracter 130 with a digital representation of the lower of the two quantities $\Delta y_i/2$ and the fixed number stored in the register 112.

The other input to the subtracter 130 constitutes the digital representation appearing in the $y_f$ register 70 so that the output of the subtracter 130 constitutes a digital representation, as measured parallel to the command axis, of the displacement from the final point of the point at which the "down" signal is to occur. This digital representation is in turn stored in an associated deceleration register 132. The representation stored in the deceleration register 132 is repeatedly transmitted to an associated subtracter 134 which also has transmitted thereto the instantaneous output of the subtracter 74, this output being a representation of the quantity $(y_f - y_a)$ representing the instantaneous actual displacement of the controlled part, as measured parallel to the command axis, from the final point. The subtracter 134 operates to produce an output or "down" signal on the line 110 when the quantity stored in the register 132 becomes greater than the quantity produced by the subtracter 74.

From the above discussion it should be noted that in situations where the line segment to be traced is such that the $\Delta y_i/2$ quantity is less than the fixed value in the register 112, the result will be that the voltage $V_i$ supplied to the digital to analog converters 51 and 53 will gradually rise from zero toward a maximum value and will, by the application of the "down" signal on the line 112, be again reduced toward a low value before reaching such maximum value, the final result being that the controlled part or print head 60 will be gradually increased in speed and then gradually decreased in speed without ever reaching its usual maximum speed due to the shortness of the line segment in question.

Also associated with the ramp generator 104 is a means for controlling the maximum value of the voltage $V_i$ supplied to the digital to analog converters 51 and 53 so that such maximum voltage value is inversely related to the quantity in the $\Delta y_i$ register 48 and so that the maximum output voltage $V_y$ of the digital to analog converter 53 is a constant regardless of the quantity in the $\Delta y_i$ register 48, the end result being that the controlled part is always moved parallel to the command or Y axis at substantially the same maximum speed (assuming that the line segment in question is sufficiently long for the part to attain such speed) regardless of the numerical value of the $\Delta y_i$ digital representation. To explain in more detail, the number stored in command axis register 48 is preferably shifted a number of places upon introduction to the register so that the most significant one of the original number occupies the most significant bit position of the register, the number introduced to the corresponding non-command axis register being shifted the same number of places. Therefore, the lowest possible value (for example 100000) of the number stored in the register 48 is equal to substantially twice its highest possible value (111111). Therefore, without any normalizing control, the maximum value of the output voltage $V_y$ from the digital to analog converter 53 could vary greatly depending on the value of the number in the register 48; whereas, in order to achieve the maximum operating speed for the control system it is desirable that the maximum value of $V_y$ remain substantially constant. To compensate for this condition, a normalizing control 140 is associated with the ramp generator 104 and operates in response to the quantity in the command axis register 48 to vary the input voltage to the ramp generator 104 such that the output voltage $V_1$ has a maximum value which is inversely related to the value of the quantity in the register 48. Therefore, if the number $\Delta y_i$ stored in the register 48 is close to the maximum value (111111), the normalizing control functions to cause the voltage $V_1$ to be limited to a given low maximum value $V_1$, but the digital to analog converter 53, due to the large value of the quantity $\Delta y_i$, will effect little or no attenuation of this voltage so that the output voltage $V_y$ will be approximately equal to the selected maximum value $V_1$. On the other hand, if the number ($\Delta y_i$) in the register 48 is close to the lowest value storable therein (100000), the normalizing control 140 functions so that the voltage $V_1$ will be limited to a higher maximum value $V_2$ which is approximately equal to $2V_1$, but in this case the digital to analog converter 53 will operate to attenuate such voltage by a factor of two, due to the low value of the number in the register 48, such that the output voltage $V_y$ is substantially equal to $V_1$ as before.

FIGS. 8a and 8b also show in more detail the construction of the computor for evaluating the function $$x = f(y) = x_i + (y_a - y_i)\frac{\Delta x_i}{\Delta y_i}$$

Referring to the drawings, this computor is shown to consist of two differential digital analyzers 142 and 144 respectively associated with the Y and X axes. The construction of each analyzer is not shown in detail but each has as an input thereto the quantity appearing in the associated $y_a$ or $x_a$ register and the quantity appearing in the associated $\Delta y_i$ or $\Delta x_i$ register 48 or 46. Each analyzer 142, 144 operates in the same manner, and considering first the analyzer 142, this analyzer contains a register (not shown) which is initially supplied with the quantity $\Delta y_i$ or any other number, the number if equal to $\Delta y_i$ being shifted in the register such that the most significant one of the number occupies the most significant bit position of the register. Another register 150 is associated with the analyzer and this register is initially supplied with the quantity in the $y_a$ register 40, this quantity initially being $y_i$. An update control 146 is associated with the analyzer and each time this control is energized by an update signal appearing on an input line 148, the analyzer 142 is operated to add the quantity $\Delta y_i$ (as shifted) to the quantity then appearing in the analyzer register. This addition may or may not produce an overflow or carry term and if a carry term is produced, it is added to the least significant position of the representation appearing in the register 150. Therefore at any time during the line drawing process the number appearing in the register 150 is equal to $y_i$ plus the summation of the carry or overflow terms produced by the operation of the analyzer 142, this summation being represented by the term $y_c$.

The update signal appearing on the line 148 is produced by a subtracter 152 which compares the output of the register 150 with the output of the $y_a$ register 40 and produces an update signal whenever a difference is detected between the quantities in these two registers. Therefore, should the quantity in the register 150 differ from the quantity in the $y_a$ register 40, the update control 146 is energized to cause operation of the analyzer 142 and to in turn cause the production of carry terms which are added to the quantity in the register 150 so as to reduce or eliminate the difference. By this means, the quantity in the register 150 is continuously maintained equal to or substantially equal to the quantity in the $y_a$ register 40. Therefore, by equating these two quantities, it is seen that $y_a = y_i + y_c$ or $y_c = y_a - y_i$.

Considering now the analyzer 144, this analyzer also has an internal register (not shown) which is initially supplied with the quantity appearing in the $\Delta x_i$ register 46, the number upon entering the register being shifted the same number of places in the same direction as the $\Delta y_i$ quantity introduced to the analyzer 142. Also associated with the analyzer 144 is a register 154 which is initially supplied with the quantity $x_i$ from the $x_a$ register 39 and which thereafter is additionally supplied with overflow or carry terms produced by operation of the analyzer 144, these overflow or carry terms being added to the least significant bit position of the register 154 and the summation of such carry terms being represented by the term $x_c$. The update control 146 is associated with both the analyzer 142 and the analyzer 144 and each time the analyzer 142 is operated thereby, the analyzer 144 is similarly operated to cause addition of the $\Delta x_i$ quantity from the register 46, as shifted, to the number then contained in the internal register of the analyzer 144. That is, each time an addition process is performed by the analyzer 142, a similar addition process is performed by the analyzer 144. Therefore, at any instant the sum of the carry terms produced by the analyzer 144 will be proportionally related to the sum of the carry terms produced by the analyzer 142 by the proportionality factor $\Delta x_i / y_i$ so that $$x_c = y_c \frac{\Delta x_i}{\Delta y_i}$$

But since $y_c$ is equal to the quantity $(y_a - y_i)$, this equation can be rewritten as $$x_c = (y_a - y_i)\frac{\Delta x_i}{\Delta y_i}$$

and therefore the quantity stored in the register 154 is seen to be a digital representation of the desired function $$x_i + (y_a - y_i)\frac{\Delta x_i}{\Delta y_i}$$

As described above, this quantity is compared by the subtracter 52 with the quantity appearing in the $x_a$ register 39 to detect any error existing between the two quantities and to produce an error signal in response to an error detection which is utilized as discussed above to exert a correcting influence on the motion of the controlled part parallel to the non-command or X axis.

Before leaving FIGS. 8a and 8b, it should also be noted that since the Y axis is the command axis, the error correction is made on the movement of the controlled part parallel to the X or non-command axis. For this reason, the direction of error signal produced by the subtracter 52 and the correcting pulses passing through the AND gate 86 are respectively applied to a direction control mechanism 160 and pulse shaper 162 associated specifically with the X axis. Also associated with the X axis is an amplifier 164, a stepping motor 166 and a differential gear mechanism 168 which are arranged and operate in the same manner as the corresponding components of the FIG. 6 system so that the resulting movement of the X axis screw shaft 62 is equal or proportionally related to the summation of the inputs to the differential gear mechanism 168 provided by the input member 16 and the output shaft 170 of the stepping motor 166.

Figure 9A:
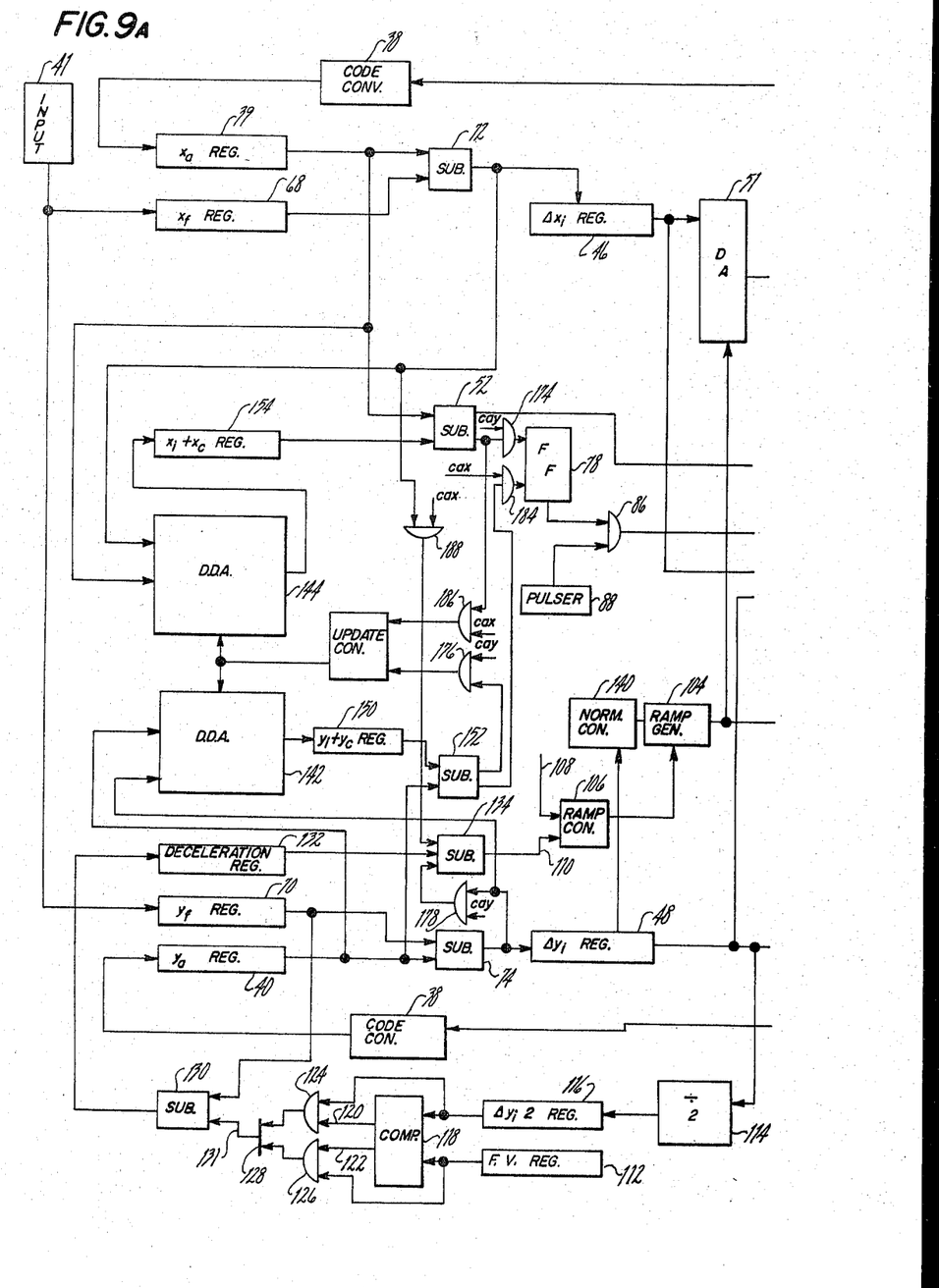
FIGS. 9a and 9b taken together are a block diagram representing a still more specific embodiment of the general system shown in FIG. 6 and more particularly showing the means for selecting the command axis preparatory to movement of the controlled part along the following path segment.
Figure 9B:
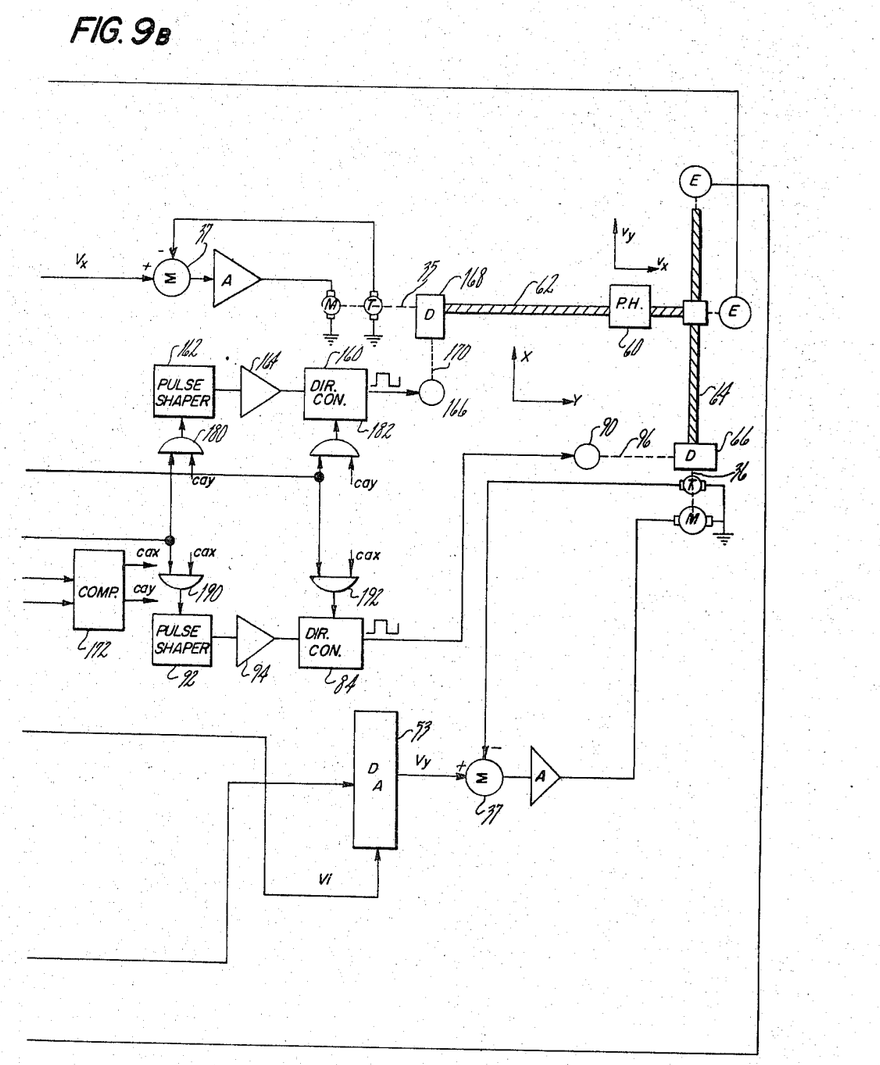

FIGS. 9a and 9b taken together show a numerical control servo system identical with that shown in FIGS. 8a and 8b except for the addition of a further refinement in the nature of means for selecting one of the two axes of movement as the command axis prior to the tracing of each line segment in accordance with a determination of along which axis the greater component of displacement is required. In FIGS. 9a and 9b, components which are similar to those shown in FIGS. 8a and 8b have been given the same reference numerals as in 8a and 8b and need not be redescribed. Considering the means for selecting the command axis, this means is shown to comprise a comparator 172 having as inputs thereto the digital representations contained in the $\Delta x_i$ register 46 and the $\Delta y_i$ register 48. The comparator 172 functions before movement of the controlled part takes place and produces an output signal on either one of its two output lines, designated cax and cay, respectively, depending upon the relative magnitudes of the $\Delta x_i$ and $\Delta y_i$ representations. If $\Delta x_i$ is numerically larger than $\Delta y_i$, an output signal is produced on the cax line and conversely if the $\Delta y_i$ representation is numerically larger than the $\Delta x_i$ representation, an output signal is produced on the cay line. The cax and cay signals are in turn transmitted to various different AND gates as shown in FIGS. 9a and 9b, the cay signal being transmitted to the AND gates 174, 176, 178, 180 and 182, and the cax signals being transmitted to the AND gates 184, 186, 188, 190 and 192, with each of said AND gates having one other input thereto as illustrated.

From a close study of FIGS. 9a and 9b, it will be noted that when an output signal appears on the cay line, the AND gates 174, 176, 178, 180 and 182 will be in an open condition so that the output of the subtracter 52 will pass to the flip-flop 78, the output of the subtracter 152 will pass to the update control 146, the output of the subtracter 74 will pass to the subtracter 134, the output of the AND gate 86 will pass to the pulse shaper 162 and the direction control output of the subtracter 52 will pass to the direction control 160. The gates 184, 186, 188, 190 and 192, will on the other hand be in a closed condition so that no signals will pass through these gates. The result will be a system entirely identical with that of FIGS. 10a and 10b wherein the Y axis is the command axis and the X axis the non-command axis. On the other hand, if the cax signal is produced by the comparator 172, the AND gates 184, 186, 188, 190 and 192 will be in an open condition and the AND gates 174, 176, 178, 180 and 182 will be in a closed condition with the result that the X axis will be the command axis and the Y axis will be the non-command axis.

At this point it should again be noted that a correcting motor drive, wherein a high power drive motor is combined with a low power error correcting motor, is not necessarily limited to use with path control systems such as shown by FIGS. 6, 7, 8a and 8b, and 9a and 9b. Instead, it will be obvious that such a drive may be employed in a wide variety of devices for the control of position or speed or acceleration in one or more coordinate axes and wherever both high power and precision control over position or speed or acceleration are required. With regard to acceleration, it should particularly be noted that the use of one or more correcting motors in combination with the main drive motor for any one axis improves the acceleration characteristics of the device insofar as the maximum acceleration of the driven part is increased and the device capable of more rapidly responding to sudden changes in the desired position or velocity of the driven part. Each correcting motor added to an axis increases the maximum acceleration at which the device is capable of moving the part, and by providing a large number of such motors almost any desired acceleration capability may be obtained.

The invention claimed is:

1. A device for driving a given movable part and for controlling its instantaneous position during such movement, said device comprising a drive motor and a correction motor each having a movable output element, means for mechanically summing the movements of said output elements of said motors, said mechanical summing means having its own output element, mechanical power transmitting means directly connected between said latter output element and said given part for driving said given part in response to the movement of said latter output element, control means responsive to a given signal and associated with said drive motor for causing said drive motor to drive said given part through said mechanical summing device means operable during the movement of said part for providing a signal which varies with time representing a desired instantaneous position of said part, means operable during the movement of said part for providing a signal representing the actual instantaneous position of said part, means for comparing said two latter signals and for providing therefrom an error signal representing the instantaneous displacement error existing between said desired and said actual instantaneous positions of said part and means for controlling said correcting motor during the movement of said part in response to said displacement error signal so that the input to said mechanical summing device provided by the output element of said correcting motor produces a correcting influence on the movement of said part tending to reduce said instantaneous displacement error.

2. The combination defined in claim 1 wherein said correcting motor has a relatively lower horsepower rating and a higher response than said drive motor.

3. A device for driving and controlling the position of a given movable part comprising a drive motor and a correcting motor each having a movable output element, means for mechanically summing the movements of said output elements of said motors, said mechanical summing means having its own output element, means for moving said given part in response to the movement of said output element of said mechanical summing means, control means responsive to a given signal and associated with said drive motor for causing said drive motor to drive said given part through said mechanical summing device and to maintain said given part at approximately a desired position, means for detecting the displacement error existing between the desired and actual positions of said given part and for producing a displacement error signal different from said given signal in response to the existence of such an error, and means for controlling said correcting motor in response to said displacement error signal so that the input to said mechanical summing device provided by the output element of said correcting motor produces a correcting influence on the movement of said part tending to reduce said displacement error, said correcting motor comprising a stepping motor, and said means for controlling said correcting motor comprising means for supplying pulses of electrical energy to said stepping motor in response to the presence of a displacement error signal.

4. The combination defined in claim 1 wherein said correcting motor comprises the motor of a displacement error correcting servo system, and said means for controlling said correcting motor comprises means for applying an input signal to said displacement error correcting servo system which input signal is analogously related to the magnitude of said displacement error.

5. A device for driving a given movable part between selected end positions and for precisely controlling its displacement from a given reference position during such movement, said device comprising a drive motor and a correction motor each having a movable output element, means for mechanically summing the movements of said output elements of said motor, said mechanical summing means having its own output element, mechanical power transmitting means directly connected between said latter output element and said given part for driving said given part in response to the movement of said output element of said mechanical summing means, control means associated with said drive motor for causing said drive motor to drive said given part through said mechanical summing device and to maintain the displacement of said given part at approximately a desired displacement which varies with time as said part is moved between two selected end positions, means operable during said latter movement for repeatedly detecting the displacement error existing between the actual value of said displacement and the desired value of such displacement prevailing at the time of the detection and for producing a displacement error signal in response to the existence of such an error, and means for controlling said correcting motor in response to the error signals repetitively produced by said latter means so that the input of said mechanical summing device provided by the output element of said correcting motor produces a correcting influence on the movement of said part tending to reduce said displacement error.

6. A device for driving a given movable part between selected end positions along a given coordinate axis and for precisely controlling its displacement as measured along said coordinate axis from a given reference position during such movement, said device comprising in combination: drive means for moving said part along said coordinate axis in response to a given signal, means operable during the movement of said part between said selected end positions for providing a signal which varies with time representing an instantaneous desired position of said part, means operable during the movement of said part between two selected end positions for repeatedly providing a signal representing the instantaneous actual position of said part with respect to said coordinate axis, means for comparing said signal representing said instantaneous desired position with said repeatedly produced signal representing said actual position and for producing an error signal different from said given signal in response to a difference between the positions represented by said latter two signals, and means operable during the movement of said part between said selected end positions and responsive to the error signal repeatedly produced by said latter means for introducing a correcting factor into the movement of said part along said coordinate axis so as to tend to reduce said difference.

7. A device for driving a given movable part between selected end positions along a given coordinate axis, said device comprising in combination: main drive means having an output member, a differential gear mechanism having two input members one of which is drivingly connected with said output member of said main drive means and also having an output member drivingly connected with said part, means operable during the movement of said part between said selected end positions for providing a signal which varies with time representing an instantaneous desired position of said part along said coordinate axis, means operable during the movement of said part between said selected end positions for repeatedly providing a signal representing the instantaneous actual position of said part with respect to said coordinate axis, means for comparing said signal representing said instantaneous desired position with said repeatedly produced signal representing said actual position and for producing an error signal in response to a difference between the positions represented by said latter two signals, and means operable during the movement of said part between said selected end positions and responsive to the error signal repeatedly produced by said latter means for moving said other input member of said differential gear mechanism.

8. A device for controlling the motion of a given part, said device comprising: a main drive motor of relatively high horsepower, a differential gear mechanism having two input members one of which is drivingly connected with said main drive motor and also having an output member drivingly connected with said part through a mechanical power transmitting means, means for detecting a displacement error in the instantanous position of said part, and a secondary drive motor of relatively low horsepower responsive to the detection of a displacement error by said latter means for driving the other input member of said differential gear mechanism in such a direction as to tend to reduce such error.

9. A device as defined in claim 8 further characterized by said main drive motor comprising a rate servo motor and said secondary drive motor comprising a stepping motor.

10. A motion control device for moving a part along a desired path with respect to a coordinate system including two mutually perpendicular reference axes respectively designated the command axis and the non-command axis, said device comprising in combination: means including two main drive motors each associated with a respective one of said axes for simultaneously moving said part parallel to said command axis and parallel to said non-command axis at respective rates which are proportionally related to each other by a proportionality factor substantially equal to the slope of said desired bath at the point thereon defined by the intersection of said path with a line parallel to said non-command axis and passing through the instantaneous actual position of said part, means operable during the movement of said part for providing an error signal representing the displacement of said part from said desired path as measured parallel to said non-command axis, and means including a correcting motor connected to the main drive motor for said non-command axis through a mechanical summing device and responsive to said error signal for introducing a correcting influence on the movement of said part parallel to said non-command axis such as to tend to reduce said error signal.

11. A motion control device for moving a part along a desired path with respect to a coordinate system including two mutually perpendicular reference axes respectively designated the command axis and the non-command axis, said device comprising in combination: means including two main drive motors each associated with a respective one of said axes for simultaneously moving said part parallel to said command axis and parallel to said non-command axis at respective rates which are proportionally related to each other by a proportionality factor substantially equal to the slope of said desired path at the point thereon defined by the intersection of said path with a line parallel to said non-command axis and passing through the instantaneous actual position of said part, means for repeatedly providing a signal representing the desired displacement of said part from said command axis corresponding to the instantaneous actual displacement of said part from said non-command axis, means for comparing said latter signal with the actual displacement of said part from said command axis and for producing a signal representing the error therebetween, and means responsive including a correcting motor connected to the main drive motor for said non-command axis through a mechanical summing device and to said error signal for introducing a correcting influence on the movement of said part parallel to said non-command axis such as to tend to reduce said error signal.

12. A motion control device for causing a part to move along a desired path with respect to a coordinate system including two mutually perpendicular reference axes respectively designated the command axis and the non-command axis, said device comprising in combination: means for sensing the actual position of said part relative to said command and non-command axes and for repeatedly providing digital representations of the actual displacement of said part from said command axis and the actual displacement of said part from said non-command axis, means for repeatedly providing a digital representation of the slope of said desired path at the point thereon defined by the intersection of said path with a line parallel to said non-command axis and passing through the instantaneous actual position of said part, means for simultaneously moving said part parallel to said command axis and parallel to said non-command axis at respective rates which are proportionally related to each other by a proportionality factor substantially equal to the said slope, means for repeatedly providing a digital representation of the desired displacement of said part from said command axis corresponding to the instantaneous actual displacement of said part from said non-command axis, means for comparing said latter digital representation with said digital representation of the displacement of said part from said command axis and for producing a digital representation of the error therebetween, and means responsive to said digital error representation for introducing a correcting influence on the movement of said part parallel to said non-command axis such as to tend to reduce said digital error representation toward zero.

13. A motion control device for moving a part with respect to a coordinate system including two mutually perpendicular reference axes respectively designated the command (X) axis and the non-command (Y) axis and along a desired path representing a known function $(y=f(x))$ defining the displacement of the part from one axis as a function of the displacement of the part from the other axis, said device comprising in combination: means for sensing the actual position of said part relative to said command and non-command axes and for repeatedly providing digital representations of the actual displacement $(y_a)$ of said part from said command axis and the actual displacement $(x_a)$ of said part from said non-command axis, means for repeatedly providing a digital representation of the slope $$\left(\left(\frac{dy}{dx}\right)_{x_a}\right)$$

of said desired path at the point $(x_a, f(x_a))$ thereon defined by the intersection of said path with a line parallel to said non-command axis and passing through the instantaneous actual position of said part, means for simultaneously moving said part parallel to said command axis and parallel to said non-command axis at respective rates $(v_x$ and $v_y)$ which are proportionally related to each other by a proportionality factor (K) substantially equal to said slope $(v_x=Kv_y$, where $$K \approx \left(\frac{dy}{dx}\right)_{x_a})$$

means for repeatedly providing a digital representation of the desired displacement $(f(x_a))$ of said part from said command axis corresponding to the instantaneous actual displacement $(x_a)$ of said part from said non-command axis, means for comparing said latter digital representation $(f(x_a))$ with said digital representation of the displacement $(y_a)$ of said part from said command axis and for producing a digital representation $(E=f(x_a)-y_a)$ of the error therebetween, and means responsive to said digital error representation (E) for introducing a correcting influence on the movement of said part parallel to said non-command axis such as to tend to reduce said digital error representation toward zero.

14. A motion control device for causing a part to move along a desired path with respect to a coordinate system including two mutually perpendicular reference axes respectively designated the command axis and the non-command axis, said device comprising in combination: means for sensing the actual position of said part relative to said command and non-command axes and for repeatedly providing digital representations of the actual displacements of said part from said command and said non-command axes, means for respeatedly providing a digital representation of the slope of said desired path at the point thereon defined by the intersection of said path with a line parallel to said non-command axis and passing through the instantaneous actual position of said part, means for converting said digital slope representation into two analog signals the controlled properties of which have values that are proportionally related to each other by a proportionality factor substantially equal to said slope, means including a first velocity servo system for moving said part parallel to said command axis at a velocity proportionally related to the controlled property of one of said analog signals, means including a second velocity servo system for moving said part parallel to said non-command axis at a velocity proportionally related to the controlled property of the other of said analog signals, means for repeatedly providing a digital representation of the desired displacement of said part from said command axis corresponding to the instantaneous actual displacement of said part from said non-command axis, means for comparing said latter digital representation with said digital representation of the displacement of said part from said command axis and for producing a digital representation of the error therebetween, and means responsive to said digital error representation for introducing a correcting influence on said means for moving said part parallel to said non-command axis so as to tend to reduce said digital error representation toward zero.

15. A motion control device for moving a part along a straight line path between a given starting point and a desired end point with respect to a coordinate system including two mutually perpendicular reference axes respectively designated the command axis and the non-command axis, said device comprising in combination: means providing digital representations of the command axis and non-command axis coordinates of said starting and end points of said path, means for subtracting the digital representation of the command axis coordinate of said end point from the digital representation of the command axis coordinate of said starting point to provide a digital representation of the required change in position of said part as measured along said command axis, means for subtracting the digital representation of the non-command axis coordinate of said end point from the digital representation of the non-command axis coordinate of said starting point to provide a digital representation of the required change in position of said part as measured along said non-command axis, means responsive to said digital representations of the required positional changes of said part for simultaneously moving said part parallel to said command axis and parallel to said non-command axis at respective rates which bear the same ratio to each other as do said digital representations of said required positional changes, means operable during the movement of said part for providing an error signal representing the displacement of said part, as measured parallel to said non-command axis, from said path, and means responsive to said error signal for introducing a correcting influence on the movement of said part parallel to said non-command axis such as to tend to reduce said error signal.

16. A motion control device for moving a part along a straight line path between a given starting point and a desired end point with respect to a coordinate system including two mutually perpendicular reference axes respectively designated the command axis and the non-command axis, said device comprising in combination: means for sensing the actual position of said part relative to said command and non-command axes and for repeatedly providing digital representations of the actual command axis and non-command axis coordinates of said part, means providing digital representations of the command axis and non-command axis coordinates of said end points of said path, means operable prior to movement of said part for subtracting the digital representation of the command axis coordinate of said end point from the digital representation of the command axis coordinate of the actual position of said part to provide a digital representation of the required change in position of said part as measured along said command axis, means operable prior to movement of said part for subtracting the digital representation of the non-command axis coordinate of said end point from the digital representation of the non-command axis coordinate of the actual position of said part to provide a digital representation of the required change in position of said part as measured along said non-command axis, means responsive to said digital representations of the required positional changes of said part for simultaneously moving said part parallel to said command axis and parallel to said non-command axis at respective rates which bear the same ratio to each other as do said digital representations of said required positional changes, means operable during the movement of said part for repeatedly providing a digital representation of the desired displacement of said part from said command axis corresponding to the instantaneous actual displacement of said part from said non-command axis, means for comparing said latter digital representation with said digital representation of the displacement of said part from said command axis and for producing a digital representation of the error therebetween, and means responsive to said digital error representation for introducing a correcting influence on the movement of said part parallel to said non-command axis such as to tend to reduce said digital error representation toward zero.

17. A motion control device for moving a part along a straight line path between a given starting point and a desired end point with respect to a coordinate system including two mutually perpendicular reference axes respectively designated the command axis and the non-command axis, said device comprising in combination: first and second and third movable input drive members, means for simultaneously moving said first and said second input drive members at respective rates which have a ratio one to the other substantially proportionally related to the slope of said path, first drive means for converting movement of said first input drive member into movement of said part parallel to said command axis, second drive means including a differential mechanism for combining the movement of said second and third input drive members and for converting the resultant of such combination into movement of said parallel to said non-command axis, means operable during the movement of said part for repeatedly providing a digital representation of the displacement of said part from said path as measured parallel to said non-command axis, and means for moving said third input drive member at a rate analogously related to said digital representation.

18. A motion control device as defined in claim 17 further characterized by said means for moving said third input drive member including a rate servo system, and means for converting said digital representation into an analogously related voltage which serves as a control voltage signal for said rate servo system.

19. A motion control device for moving a part along a straight line path between a given starting point and a desired end point with respect to a coordinate system including two mutually perpendicular reference axes respectively designated the command axis and the non-command axis, said device comprising in combination: first and second and third movable input drive members, means for simultaneously moving said first and second input drive member at respective rates which have a ratio one to the other substantially proportionally related to the slope of said path, first drive means for converting movement of said first input drive members into movement of said part parallel to said command axis, second drive means including a differential mechanism for combining the movement of said second and third input drive members and for converting the resultant of such combination into movement of said part parallel to said non-command axis, means operable during the movement of said part for repeatedly providing a digital representation of the displacement of said part, as measured parallel to said non-command axis, from said path, and means for moving said third input drive member whenever said digital representation is greater than zero and in such a direction as to tend to reduce said digital representation toward zero.

20. A motion control device as defined in claim 19 further characterized by said means for moving said third input drive member comprising a stepping motor and means for transmitting pulses of electrical energy to said stepping motor to operate the same whenever said digital representation is greater than zero.

References Cited

UNITED STATES PATENTS

| | | | |
|---|---|---|---|
| 2,867,759 | 1/1959 | Comstock | 318—19 XR |
| 3,358,201 | 12/1967 | Jones | 318—24 XR |
| 3,146,386 | 8/1964 | Gerber | 318—8 |
| 3,178,563 | 4/1965 | Wedgewood | 318—19 X |
| 3,179,868 | 4/1965 | Schaefer | 318—28 X |
| 3,202,893 | 9/1965 | Arp et al. | 318—13 |
| 3,214,659 | 10/1965 | Watt | 318—18 |
| 3,217,219 | 11/1965 | Muldoon. | |
| 3,289,061 | 11/1966 | Stratman | 318—18 |

BENJAMIN DOBECK, *Primary Examiner.*

U.S. Cl. X.R.

318—28, 30